(12) United States Patent
Wakabayashi (10) Patent No.: US 7,669,295 B2
(45) Date of Patent: Mar. 2, 2010

(54) CLIP

(75) Inventor: Yasuki Wakabayashi, Kanagawa (JP)

(73) Assignee: Piolax, Inc., Yokohama-shi, Kanagawa-ken (JP)

( * ) Notice: Subject to any disclaimer, the term of this patent is extended or adjusted under 35 U.S.C. 154(b) by 593 days.

(21) Appl. No.: 11/478,708

(22) Filed: Jul. 3, 2006

(65) Prior Publication Data

US 2007/0065256 A1 Mar. 22, 2007

(30) Foreign Application Priority Data

Sep. 21, 2005 (JP) ............................ P2005-273745

(51) Int. Cl.
*F16B 19/08* (2006.01)
*F16B 21/00* (2006.01)
*F16B 21/08* (2006.01)

(52) U.S. Cl. ............................... 24/297; 24/453; 24/289

(58) Field of Classification Search ................... 24/289, 24/297, 453; 296/97.9, 214; 411/508, 510
See application file for complete search history.

(56) References Cited

U.S. PATENT DOCUMENTS

| | | | |
|---|---|---|---|
| 4,627,760 A * | 12/1986 | Yagi et al. ...................... 24/297 |
| 5,662,375 A * | 9/1997 | Adams et al. .................. 24/297 |
| 5,724,709 A | 3/1998 | Kittman et al. |
| 5,758,987 A * | 6/1998 | Frame et al. ................... 24/297 |
| 5,797,714 A | 8/1998 | Oddenino |
| 6,042,296 A * | 3/2000 | Wittig et al. ................... 24/297 |
| 6,581,252 B1 * | 6/2003 | Sedlock et al. ................ 24/297 |
| 7,293,824 B2 * | 11/2007 | Dobson ....................... 296/214 |
| 7,337,505 B1 * | 3/2008 | Scroggie et al. ............... 24/297 |
| 7,401,388 B2 * | 7/2008 | Hansen ......................... 24/297 |
| 2006/0231690 A1 | 10/2006 | Cooley et al. |

FOREIGN PATENT DOCUMENTS

| | | |
|---|---|---|
| EP | 1 712 801 A1 | 10/2006 |
| GB | 2 420 150 A | 5/2006 |
| JP | 2001-245427 | 9/2001 |

OTHER PUBLICATIONS

Great Britain Office Action dated Oct. 31, 2006.
British Office Action dated Feb. 5, 2009.

* cited by examiner

*Primary Examiner*—Robert J Sandy
(74) *Attorney, Agent, or Firm*—McGinn IP Law Group, PLLC (57) ABSTRACT

A clip to be inserted into and fixed to a rectangular hole formed in an attached member includes: a base body portion that engages the rectangular hole on a one side of the attached member; a stem portion that extends from the base body portion to be insertable into the rectangular hole; and a pair of engaging legs that extend from an end portion of the stem portion toward the base body portion in an anchor leg-like manner. Engaging portions are disposed in ends of the engaging legs, respectively, to engage the rectangular hole on the other side of the attached member. Widths of the engaging legs are formed to be gradually enlarged from the end portion of the stem portion toward the base body portion, respectively.

17 Claims, 8 Drawing Sheets

CLIP

BACKGROUND OF THE INVENTION

1. Field of the Invention

The present invention relates to a clip, which is to be inserted into and fixed to a rectangular hole formed in a attached member such as a body panel of an automobile.

2. Description of the Related Art

In order to fix an attaching member for fixing a pipe or a wire, such as a band or a clamp to a attached member, for example, a body panel of an automobile, a method is employed in which a clip attached to the attaching member by means of integration or fitting is inserted into and fixed to a rectangular hole formed in the attached member.

Usually, such a clip includes: a base body portion which is to be engaged with the rectangular hole on a one side face of the attached member; a stem portion that extends from the base body portion to be insertable into the rectangular hole; and, a pair of engaging legs which extend from an end portion of the stem portion toward the base body portion in an anchor leg-like manner, and in each of which an engaging portion that is to be engaged with the rectangular hole on the other side face of the attached member is disposed in the end portion of the engaging portion.

On the other hand, JP-A-2001-245427 discloses a harness-attachment clip including: an attaching seat (base body portion) for attaching a harness; a base portion (stem portion) that extends from the attaching seat; and a pair of engaging arms (engaging legs) that are projected from an end portion of the base portion toward the both lateral sides, respectively, and in which a solid coated lubrication layer is formed on the outer side faces of the engaging arms.

SUMMARY OF THE INVENTION

In the conventional clip, each of the engaging legs extends at a substantially constant width over the range from a base portion of the engaging legs continuous to the stem portion to the end portion of the engaging legs to be engaged with the rectangular hole. Therefore, a large pushing force is needed when the engaging legs are inserted while being inward bent and in sliding contact with the inner periphery of the rectangular hole. In the case where the clip is to be inserted into a rectangular hole having a rough edge, consequently, it is difficult to push the clip, and the workability may sometimes deteriorate.

In the clip disclosed in JP-A-2001-245427, the resistance of insertion into an attachment hole is reduced by the solid coated lubrication layer formed on the outer side faces of the engaging arms. However, production cost of the clip is high.

The present invention has been made in view of above circumstances and provides a clip in which the insertion resistance can be reduced, which can be firmly fixed, and which can be produced at a relatively low cost.

According to an aspect of the invention, there is provided a clip to be inserted into and fixed to a rectangular hole formed in an attached member including: a base body portion that engages the rectangular hole on a one side of the attached member; a stem portion that extends from the base body portion to be insertable into the rectangular hole; and a pair of engaging legs that extend from an end portion of the stem portion toward the base body portion in an anchor leg-like manner, wherein engaging portions are disposed in ends of the engaging legs, respectively, to engage the rectangular hole on the other side of the attached member, and widths of the engaging legs are formed to be gradually enlarged from the end portion of the stem portion toward the base body portion, respectively.

According to the above configuration, the engaging legs have a shape in which the width is increased as advancing from the base portion of the engaging legs toward the end portion of the engaging leg. When the engaging legs are to be inserted into the rectangular hole of the attached member, therefore, the portion which is in contact with the inner periphery of the rectangular hole is reduced. Consequently, the insertion resistance can be reduced, and the workability of the insertion can be improved. Since the end portions of the engaging legs are formed wider, they are firmly engaged with the peripheral edge of the rectangular hole, so that rattling of the clip can be suppressed. The clip can be produced without requiring an expensive material or process, and hence the production cost can be reduced to a relatively low level.

In addition, widths of end portions of the engaging legs are 1.2 times wider than widths of base portions of the engaging legs, respectively. According to the above configuration, since the width of the end portion of each of the engaging legs is 1.2 times wider than the width of the base portion of the engaging legs, the insertion resistance in insertion into the rectangular hole can be sufficiently reduced, and rattling of the clip in engagement with the rectangular hole can be effectively suppressed.

In addition, each of the engaging legs may includes: a straight portion that extends at a substantially constant width from the base portions of the engaging legs toward the end portions of the engaging legs, respectively; and a widened portion which extends from at least one side of the straight portion of the engaging legs to be gradually enlarged toward the end portions of the engaging legs, respectively, wherein outer side faces of the widened portions are formed to bend toward the stem portion than outer side faces of the straight portions, respectively.

According to the above configuration, the outer side face of the widened portion of each of the engaging legs is formed to bend toward the stem more than the outer side face of the straight portion. In the insertion into the rectangular hole, therefore, only the outer side faces of the straight portions are in contact with the inner periphery of the rectangular hole, and the insertion resistance can be further reduced.

In addition, at least one sides of the end portions of the engaging legs may be in a substantially identical position in a width direction as a base portion of the stem portion.

According to the above configuration, when the clip is engaged with the rectangular hole, the base portion of the stem portion and at least one side of the end portions of the engaging legs butt against a side edge of the inner periphery of the rectangular hole. Therefore, rattling of the fixed clip can be more effectively suppressed.

In addition, the engaging legs are formed to extend at a constant width in a predetermined length range from each of the base portions of the engaging legs, and to be gradually enlarged as advancing from middle portions of the engaging leg toward the end portions of the engaging legs.

According to the above configuration, since the base portions of the engaging legs extend at the constant width in the predetermined length range, the portion contacting with the inner periphery of the rectangular hole in the insertion into the rectangular hole can be reduced, and the engaging legs can be made more bendable. Therefore, the insertion resistance can be further reduced.

According to the above configuration, the engaging legs have a shape in which the width is increased as advancing from the base portion of the engaging leg toward the end portion of the engaging legs. When the engaging legs are to be inserted into the rectangular hole of the attached member, therefore, the portion which is in contact with the inner periphery of the rectangular hole is reduced. Consequently, the insertion resistance can be reduced, and the workability of the insertion can be improved. Since the end portions of the engaging legs are formed wider, they are firmly engaged with the peripheral edge of the rectangular hole, so that rattling of the clip can be suppressed. The clip can be produced without requiring an expensive material or process, and hence the production cost can be reduced to a relatively low level.

BRIEF DESCRIPTION OF THE DRAWINGS

Embodiments of the present invention will be described in detail based on the following figures, wherein:

FIGS. 1A to 1C show a clip according to the embodiment of the invention.

FIGS. 2A to 2C show the clip.

FIGS. 3A to 3C show a state where the clip is inserted into and fixed to the rectangular hole of the attached member.

FIGS. 4A and 4B shows a clip according to another embodiment of the invention.

FIGS. 6A to 6C show the clip.

FIGS. 7A to 7C show a state where the clip is inserted into and fixed to the rectangular hole of the attached member, FIGS. 8A to 8C show rattling states where clips of comparative examples and the clip according to the embodiment of the invention are fixed to a rectangular hole.

DETAILED DESCRIPTION OF THE INVENTION

Hereinafter, embodiments of the clip of the invention will be described with reference to the accompanying drawings.

FIGS. 1A to 3C show an embodiment of the clip of the invention.

Figure 1A:
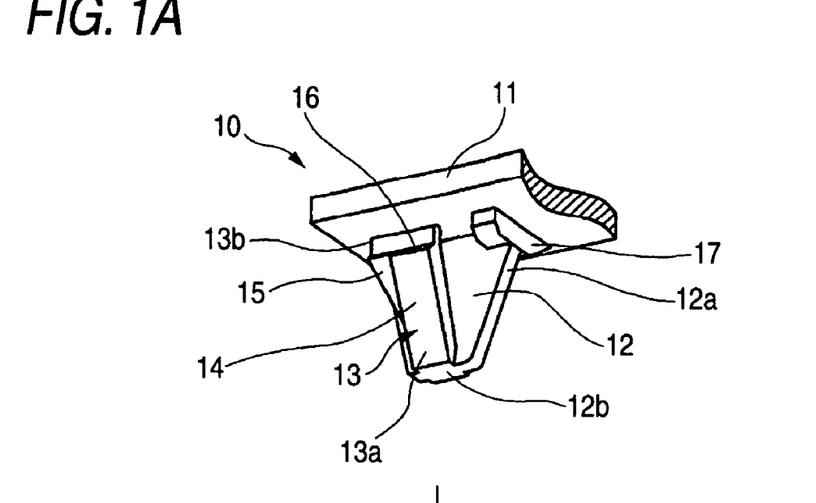
FIG. 1A is a perspective view as seen from an obliquely downward side.
Figure 1B:
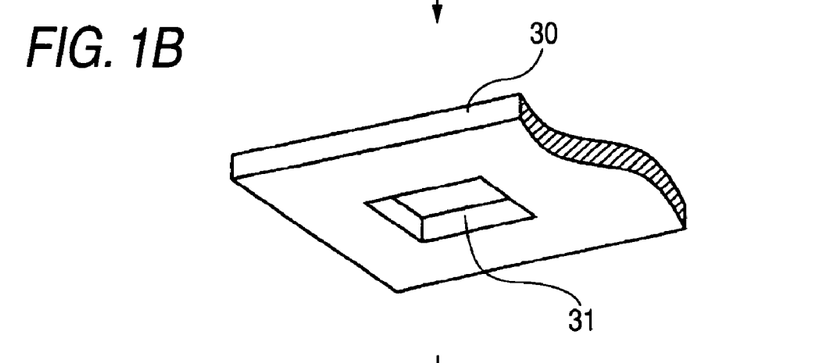
FIG. 1B is a perspective view showing a rectangular hole disposed in a attached member.
Figure 1C:
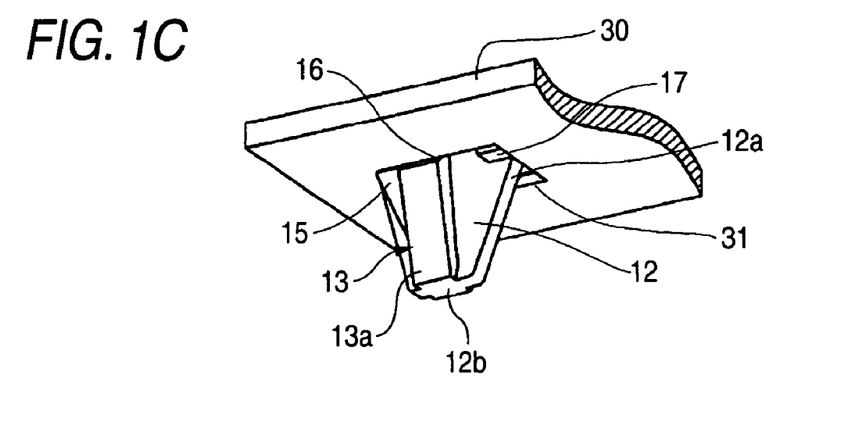
FIG. 1C is a perspective view of a state where the clip is inserted into and fixed to the rectangular hole, as seen from an obliquely downward side.

The clip 10 is applied to a hose band. One end of the hose band constitutes the base body portion according to the embodiment.

As shown FIGS. 1A to 2C, a plate-like stem portion 12 extends in a substantially perpendicular manner from one face of the base body portion 11. In the stem portion 12, the width of a base portion 12a which is continuous to the base body portion 11 is wider, and that of an end portion 12b of the stem portion is narrower. The both sides of the stem portion are formed into a tapered shape the width of which is wider as advancing toward the base body portion 11. The width of the base portion 12a of the stem portion 12 corresponds to that of the inner periphery of a rectangular hole 31 which is formed in a attached member 30.

Figure 2A:
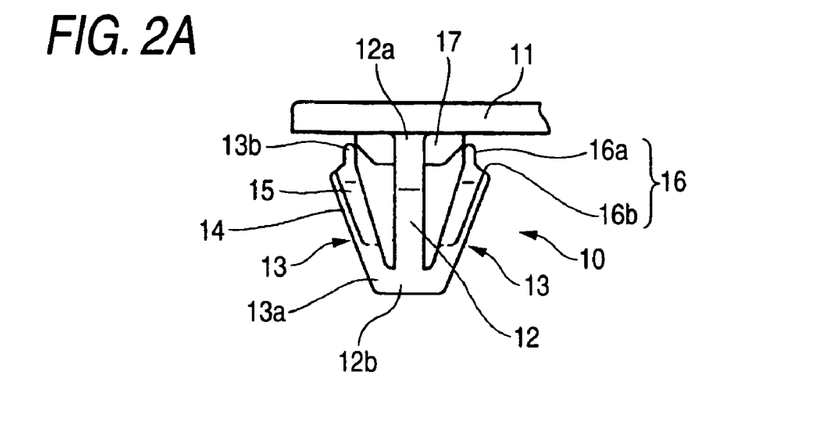
FIG. 2A is a front view.

A pair of engaging legs 13, 13 extend from the end portion 12b of the stem portion 12 toward the base body portion 11 in an anchor leg-like manner. Each of the engaging legs 13 comprises: a straight portion 14 that extends at the same constant width as a portion which is continuous to the end portion 12b of the stem portion 12; and a widened portion 15 that, with starting from a middle of the straight portion 14 in the length direction, is gradually enlarged in the width direction from one side of the straight portion 14. The widened portion 15 has a triangular shape which starts from a middle of the straight portion 14, and which extends in one lateral direction. The widened portion 15 is thinner than the straight portion 14 so that the outer side face of the widened portion 15 is located in a position bending toward the stem portion 12 with respect to that of the straight portion 14. End portions of the straight portion 14 and the widened portion 15 constitute an end portion 13b of the engaging leg 13.

Figure 2B:
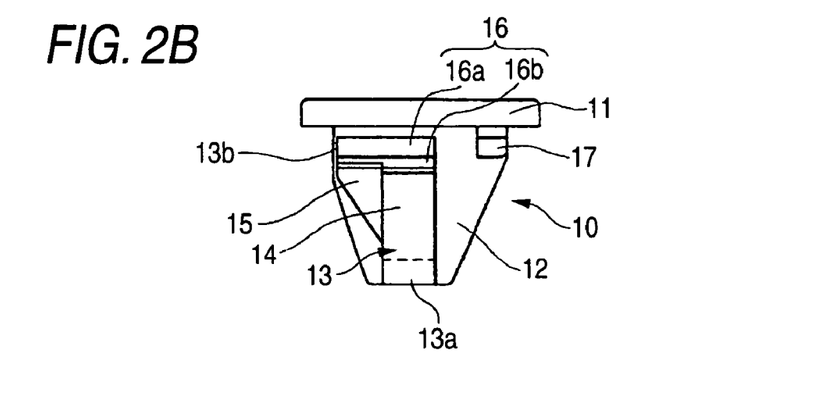
FIG. 2B is a right side view.
Figure 2C:
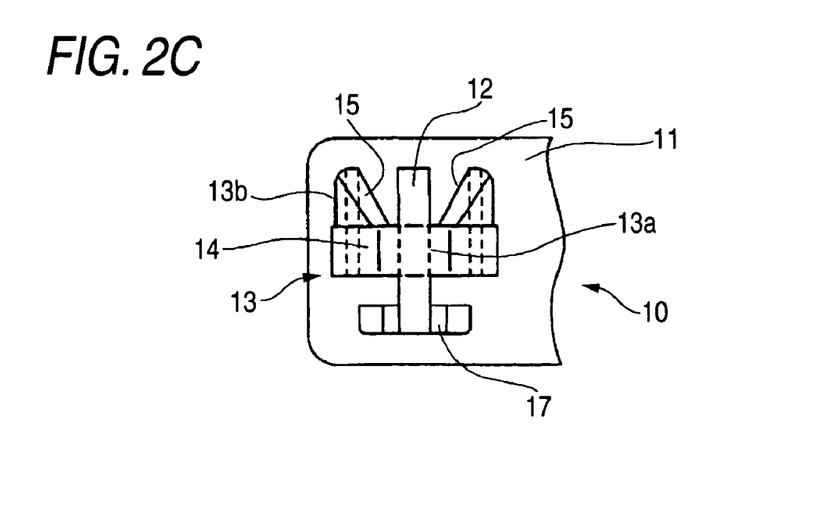
FIG. 2C is a bottom view.

As shown in FIGS. 2A to 2C, in the end portion 13b of each of the engaging legs 13, an engaging portion 16 which is to be engaged with the rectangular hole 31 of the attached member 30 is formed. The engaging portion 16 has: a thin piece 16a which is to be elastically engaged with the inner periphery of the rectangular hole 31; and an engaging step 16b which is to be engaged with a rear-face peripheral edge of the rectangular hole 31. The thin piece 16a which extends from the straight portion 14, and the thin piece 16a which extends from the widened portion 15 constitute the same face. The engaging step 16b which extends from the straight portion 14, and the engaging step 16b which extends from the widened portion 15 are formed in the same position. In a state where the engaging leg is engaged with the inner periphery of the rectangular hole 31, therefore, both the end portions of the straight portion 14 and the widened portion 15 are engaged with the inner periphery of the rectangular hole 31, and the whole width of the end portion 13b of the leg portion 13 butts against the inner periphery of the rectangular hole 31.

A width-direction end portion in the end portion of the widened portion 15 is formed so as to be in a substantially same position in the width direction as that in the base portion 12a of the stem portion 12. By contrast, in the base portion 12a of the stem portion 12, ribs 17 upstand in a direction substantially perpendicular to the stem portion 12, in an end portion opposite to the side where the widened portion 15 of the engaging leg 13 is disposed.

When the stem portion 12 and engaging legs 13 of the clip 10 are inserted into the rectangular hole 31 of the attached member 30, the width-direction end portion in the end portion of the widened portion 15, and one side in the width direction of the base portion 12a of the stem portion 12 butt against one side portion of the inner periphery of the rectangular hole 31, and the ribs 17 butt against the other side portion of the inner periphery of the rectangular hole 31, so that the clip 10 is attached to the rectangular hole 31 in a rattle-free condition.

Figure 3A:
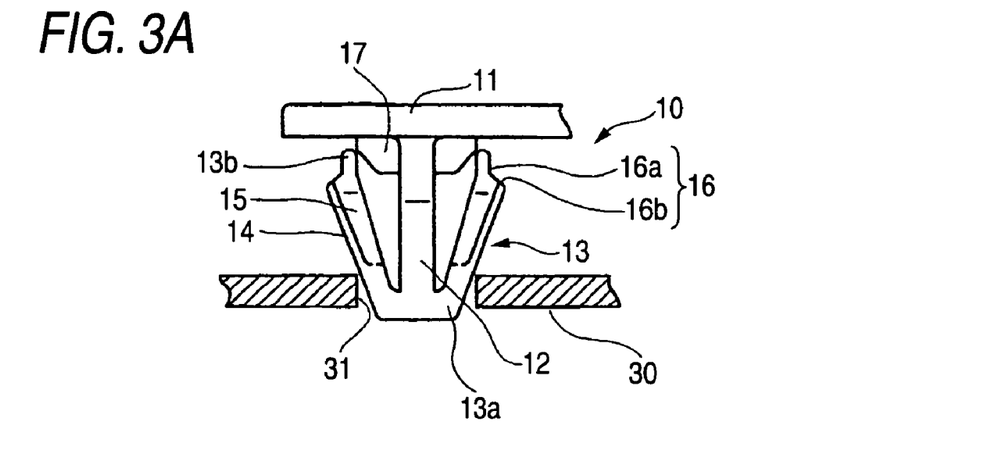
FIG. 3A is a diagram showing a state where a stem portion and engaging legs of the clip begin to be inserted.
Figure 3B:
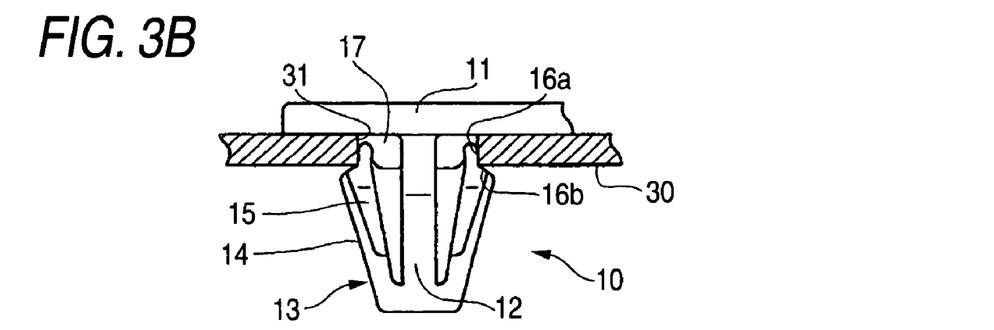
FIG. 3B is a diagram showing a state where the clip is inserted into and fixed to the rectangular hole.
Figure 3C:
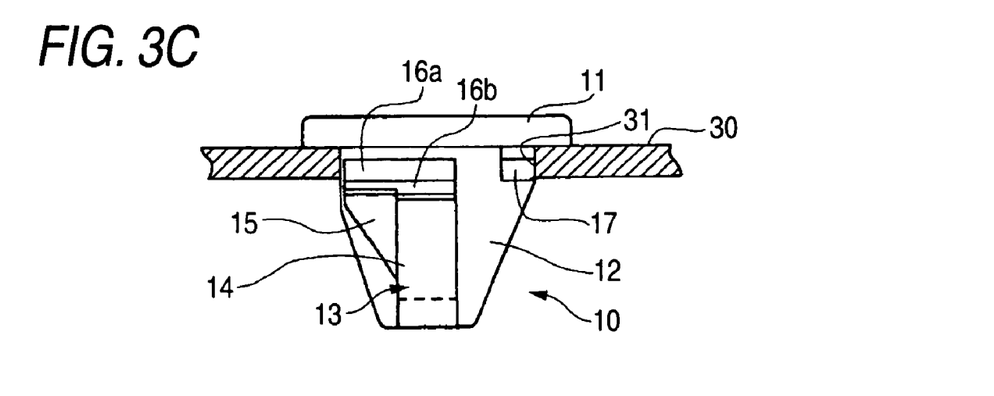
FIG. 3C is a diagram showing the inserted and fixed state as seen from a lateral side.

In FIGS. 3A to 3C show states where the clip 10 is inserted into the rectangular hole 31 of the attached member 30. In FIGS. 3A to 3C, FIG. 3A shows a state where lower end portions of the stem portion 12 and engaging legs 13 of the clip 10 begin to be inserted into the rectangular hole 31 of the attached member 30, FIG. 3B shows a state where the stem portion 12 and engaging legs 13 of the clip 10 are completely inserted into and engagingly fixed to the rectangular hole 31 of the attached member 30, and FIG. 3C shows the engagingly fixed state as seen from a lateral side.

When the stem portion 12 and engaging legs 13 of the clip 10 are to be inserted into the rectangular hole 31, they are pushed into the rectangular hole 31 while the outer side faces of the straight portions 14 of the engaging legs 13 are in sliding contact with the inner periphery of the rectangular hole 31 and the engaging legs 13 are inward bent. At this time, the outer side face of each of the widened portions 15 is located in a position which bends from the outer side face of the straight portion 14, and hence the widened portion is not in sliding contact with the inner periphery of the rectangular hole 31. Therefore, the insertion resistance in the insertion of the clip 10 can be reduced, and the pushing work can be facilitated. In addition, a thickness of the widened portion 15 may be thinner than a thickness of the straight portion 14.

In the embodiment, each of the widened portions 15 extends so as to gradually enlarged toward one lateral side from a middle of the straight portion 14 which extends from the end portion 12b of the stem portion 12. Therefore, the sectional area of each of the engaging legs 13 on the side of a base portion 13a of the engaging leg 13 is further reduced, and the engaging leg 13 is more easily bendable. Consequently, the insertion resistance can be further reduced.

When the stem portion 12 and the engaging legs 13 are completely inserted into the rectangular hole 31, the thin pieces 16a of the engaging portions 16 butt against the inner periphery of the rectangular hole 31, and the engaging steps 16b are engaged with the rear-face peripheral edge of the rectangular hole 31 as shown in FIG. 3B. Through the rectangular hole 31, therefore, the base body portion 11 butts against one face of the attached member 30, and the engaging portions 16 of the engaging legs 13 butt against the other face. Then, the clip 10 is fixed to the attached member 30.

At this time, as shown in FIG. 3C, one side of the stem portion 12, and the width-direction end portions of the widened portions 15 of the engaging legs 13 butt against one side of the inner periphery of the rectangular hole 31, and the ribs 17 butt against the other side portion of the opposite side of the inner periphery of the rectangular hole 31. Although not shown in the figures, length-direction end portions of the ribs 17 butt against the inner periphery of the other opposing edge of the rectangular hole 31. Therefore, the clip 10 is fixed to the rectangular hole 31 in a rattle-free condition. This state is shown also in FIG. 1C.

Figure 4A:
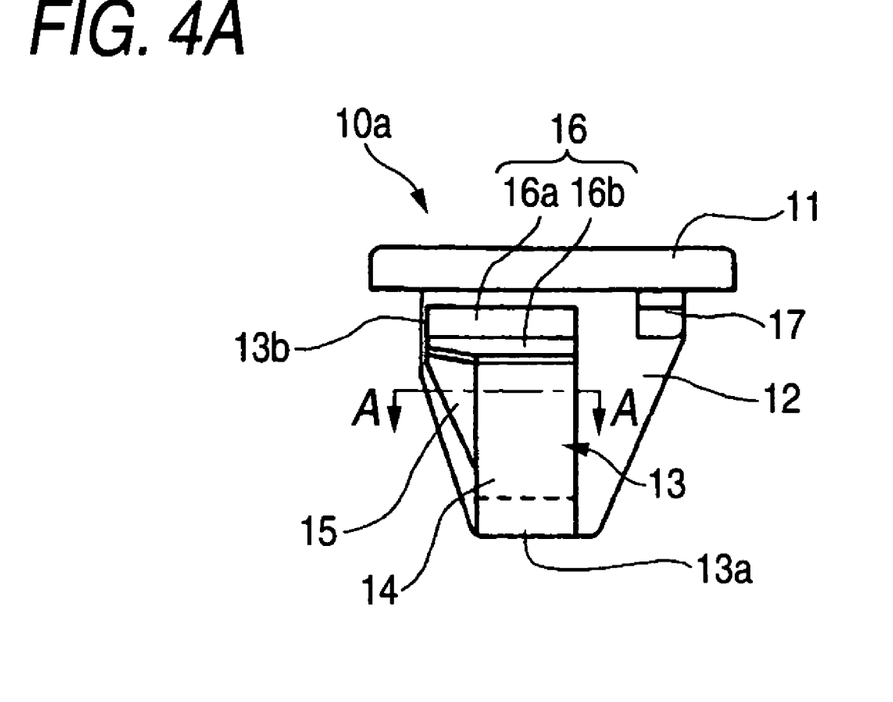
FIG. 4A is a front view.
Figure 4B:
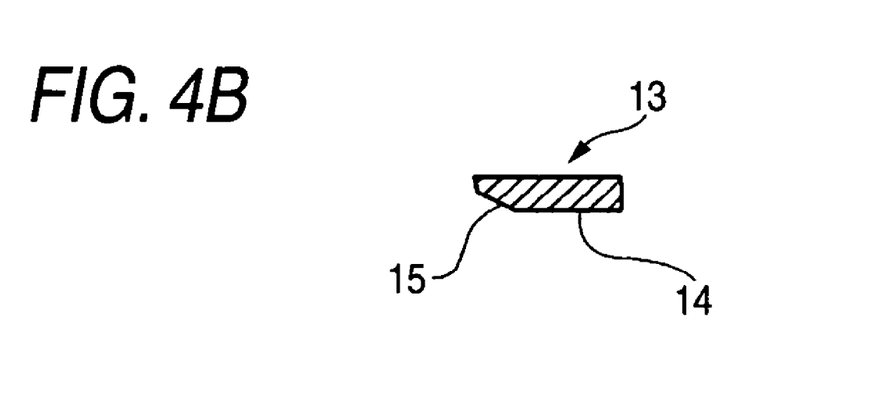
FIG. 4B is a section view taken along the arrow line A-A of FIG. 4A.
Figure 5:
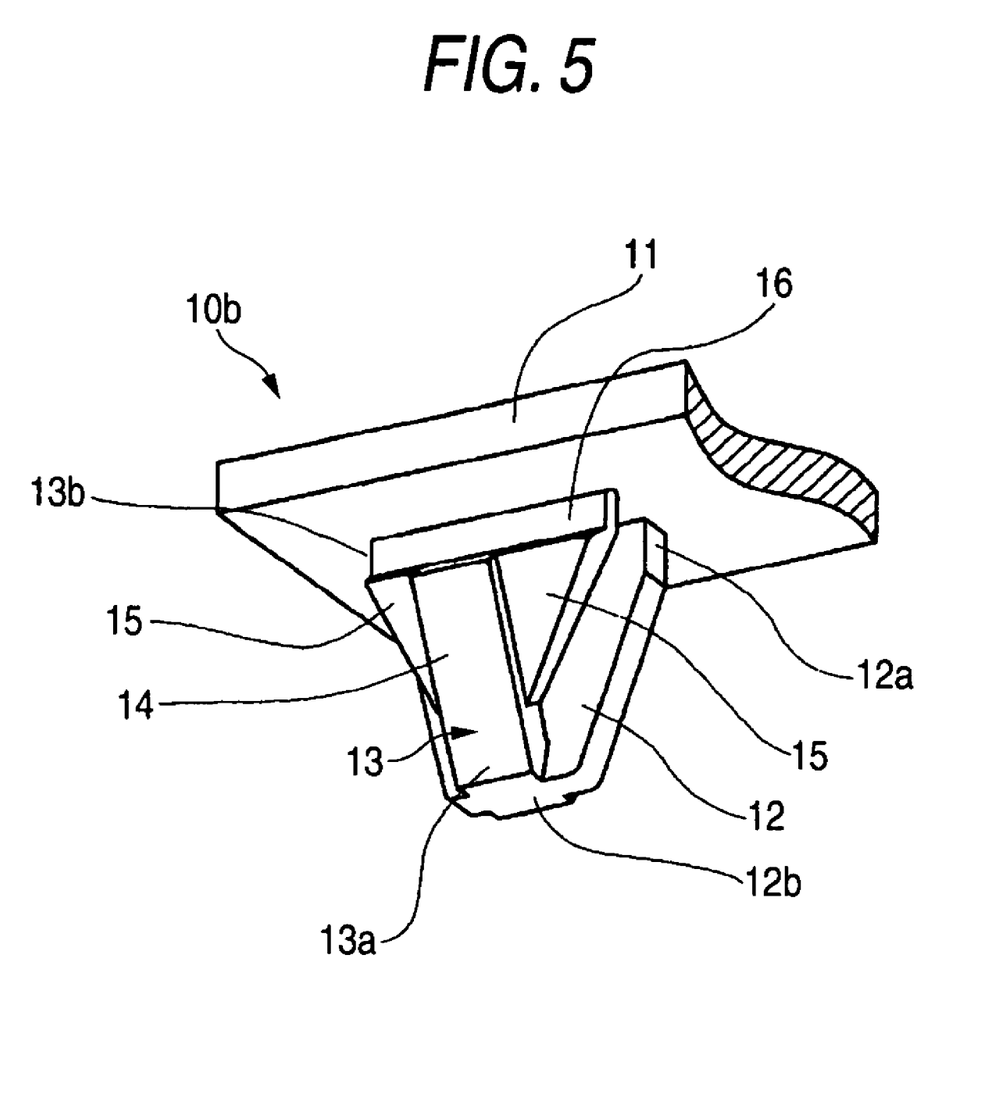
FIG. 5 is a perspective view showing a clip according to further embodiment of the invention, as seen from an obliquely downward side.
Figure 6A:
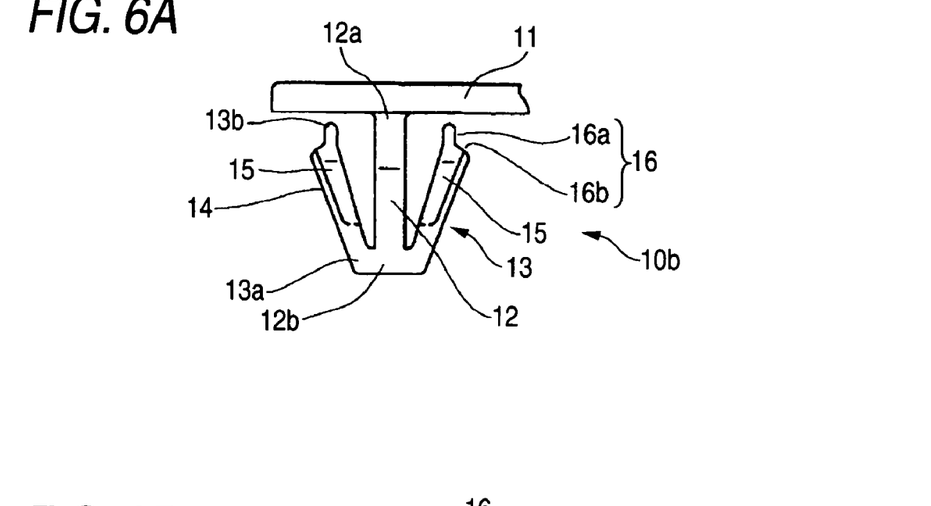
FIG. 6A is a front view.
Figure 6B:
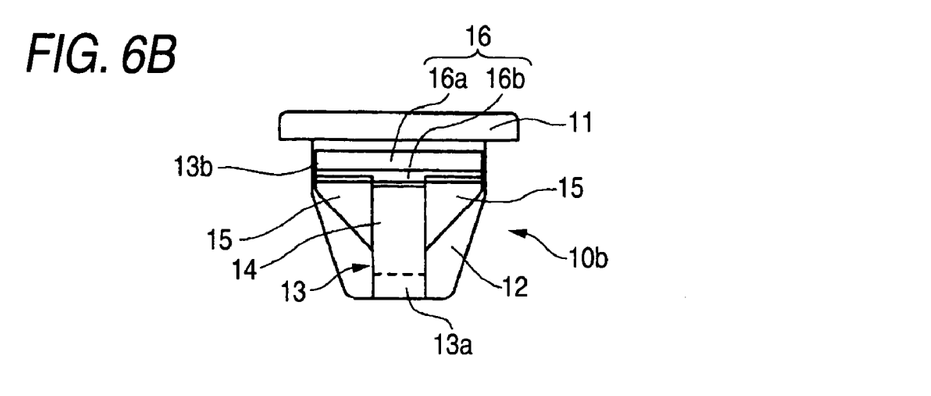
FIG. 6B is a right side view.
Figure 6C:
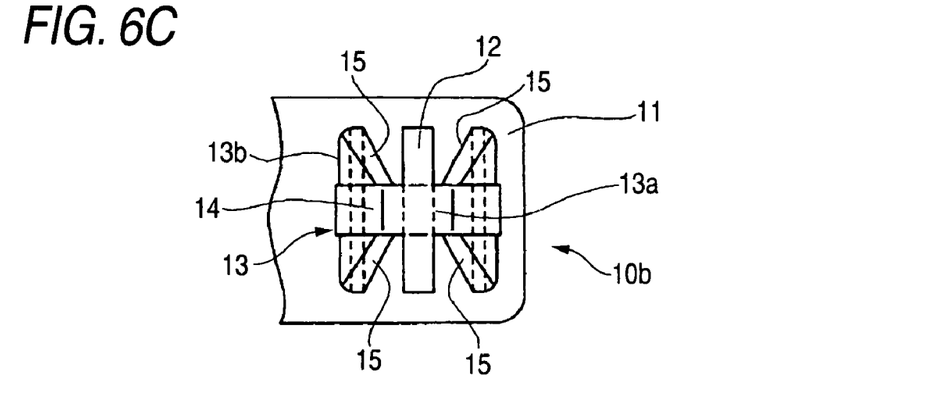
FIG. 6C is a bottom view.

In FIGS. 4A and 4B show another embodiment of the clip 10 of the invention. The clip 10a is basically structured in the same manner as the clip 10 shown in FIGS. 1A to 3C. The embodiment is different from the above-mentioned embodiment in shape of the widened portions 15. In the clip 10 of the above-mentioned embodiment, the interfaces between the straight portions 14 and the widened portions 15 are shaped as steps, and the widened portions 15 are formed as faces which are parallel to the straight portions 14. By contrast, in the clip 10a of the embodiment, the widened portions 15 are formed into a shape having a tapered face in which the thickness is gradually reduced toward the width-direction end portion of the widened portion 15, with respect to the straight portions 14 (see FIG. 4B).

According to the clip 10a of the embodiment, the widened portions 15 are not in sliding contact with the inner periphery of the rectangular hole 31 in the insertion of the clip 10a, and the thickness of the engaging legs 13 is increased as far as possible, so that the rigidity of the engaging legs 13 is enhanced.

FIGS. 5 to 7C show a further embodiment of the clip of the invention. The clip 10b is different from the above-mentioned embodiments in that the widened portion 15 is formed on the both sides of the straight portion 14 of each of the engaging legs 13. Namely, the straight portion 14 extends from the end portion 12b of the stem portion 12, and the widened portions 15 in which the width is gradually increased are formed toward the lateral sides from middle portions of the straight portion 14, respectively. End portions of the straight portion 14 and the widened portions 15 constitute the engaging portions 16 each configured by the thin piece 16a and the engaging step 16b. The width-direction end portions of the widened portions 15 constitute a width at which the portions butt against the both sides of the inner periphery of the rectangular hole 31. In the clip 10b of the embodiment, therefore, the ribs 17 in the above-mentioned embodiments are not disposed.

Figure 7A:
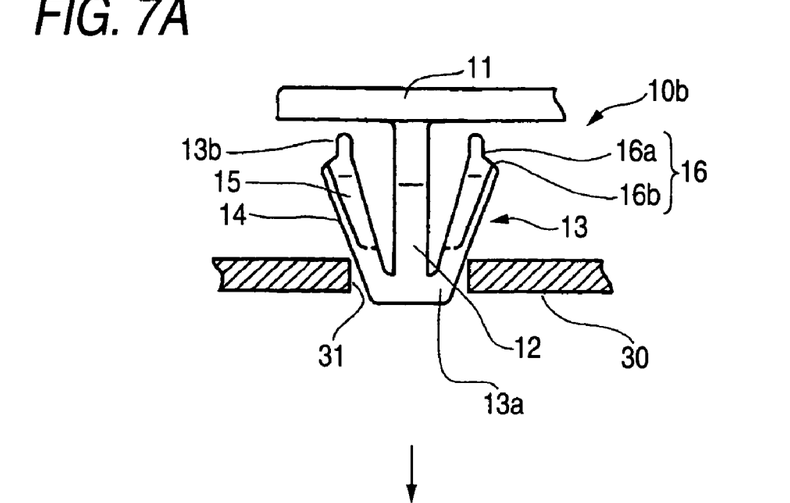
FIG. 7A is a diagram showing a state where a stem portion and engaging legs of the clip begin to be inserted.
Figure 7B:
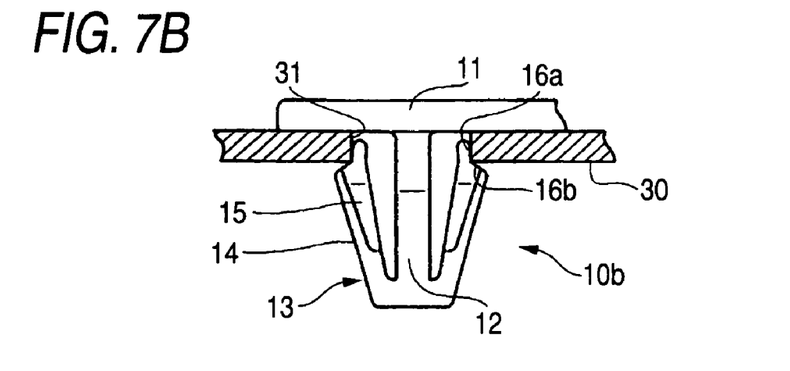
FIG. 7B is a diagram showing a state where the clip is inserted into and fixed to the rectangular hole.
Figure 7C:
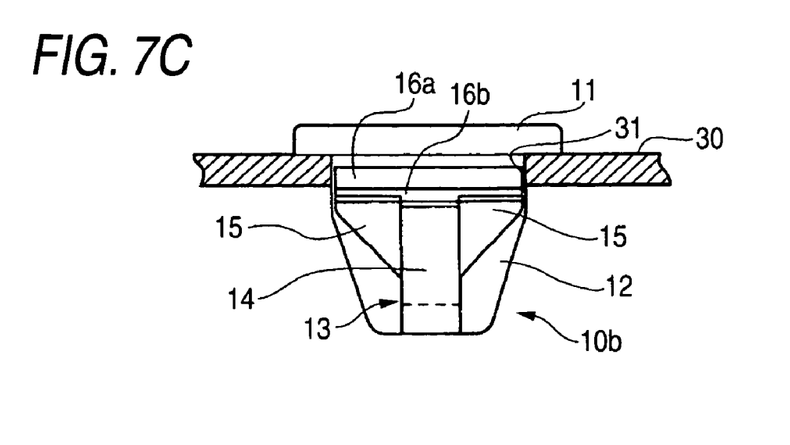
FIG. 7C is a diagram showing the inserted and fixed state as seen from a lateral side.

In FIGS. 7A to 7C, FIG. 7A shows a state where the clip 10b begins to be inserted into the rectangular hole 31 of the attached member 30, and FIGS. 7B and 7C show a state where the clip 10b is completely inserted into and engagingly fixed to the rectangular hole 31. As shown in FIG. 7C, in the clip 10b, the end portions of the widened portions 15 on the both sides of the engaging legs 13 butt against the both sides of the inner periphery of the rectangular hole 31, thereby preventing rattling from being caused. Furthermore, the engaging portions 16 of the engaging legs 13 are disposed over the range corresponding to the whole length of the rectangular hole 31, and hence the engaging force and a rattle preventing effect can be further enhanced.

EXAMPLES

Figure 8A:
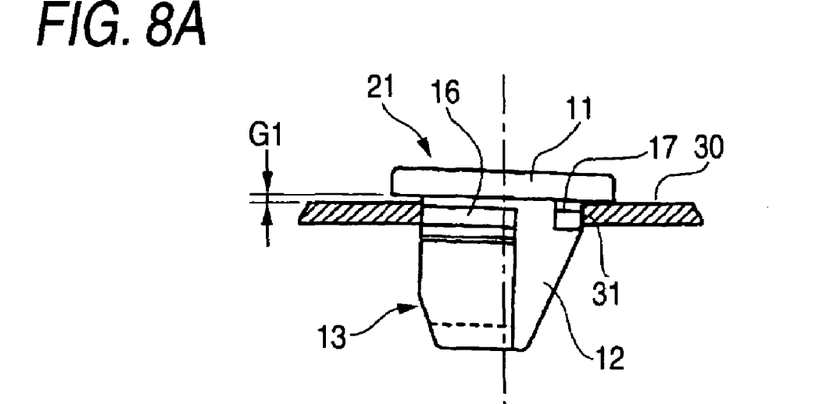
FIG. 8A is a diagram of a clip of a comparative example having wide engaging legs.
Figure 8B:
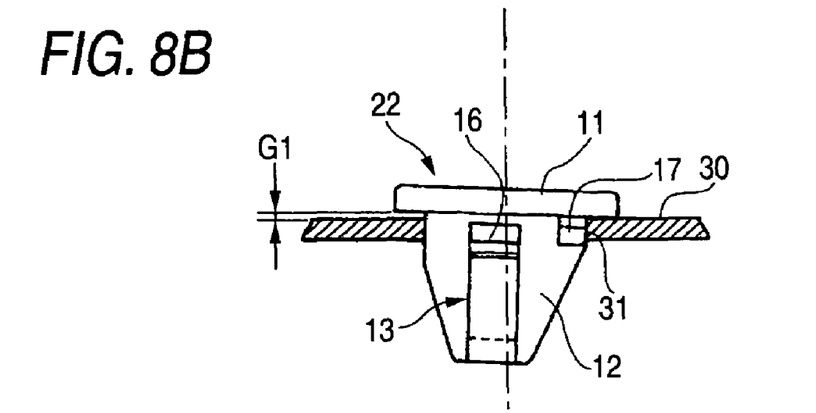
FIG. 8B is a diagram of a clip of a comparative example having engaging legs which are narrower than FIG. 8A.
Figure 8C:
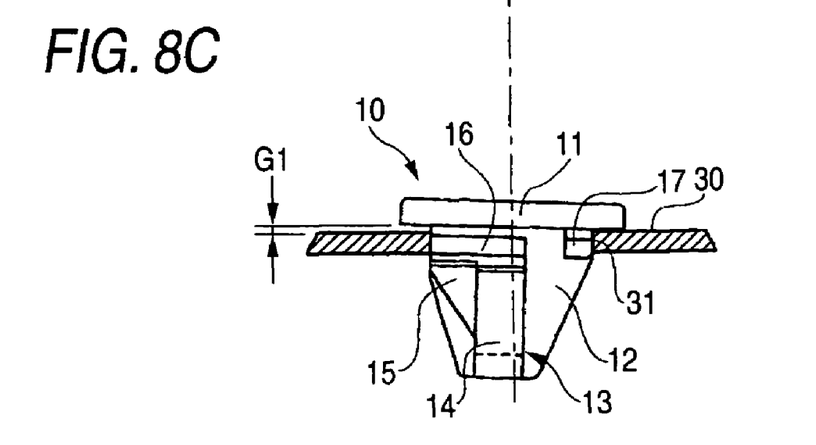
FIG. 8C is a diagram of the clip according to the embodiment of the invention.

Three kinds of clips respectively shown in FIGS. 8A to 8C were prepared, and the degrees of rattling which occurred when the respective clips were engaged with the rectangular hole 31 of the attached member 30 were compared with each other. In the figure, the portions which are substantially identical with those of the above-mentioned embodiments are denoted by the same reference numerals.

In the clip 21 of FIG. 8A, each of the engaging legs 13 is formed wider at a substantially same width from a base portion of the engaging legs toward a end portion of the engaging legs.

In the clip 22 of FIG. 8B, the engaging legs 13 are formed at the same width is equal to that of the straight portion 14 in the above-mentioned embodiments, and the widened portions 15 are not provided.

The clip of FIG. 8C is the clip of the embodiment shown in FIGS. 1A to 3C.

The three kinds of clips were inserted into the rectangular hole 31 of the attached member 30, and gaps G1 in the case where the clips were tilted to one side were measured. The results are shown in Table 1 below.

TABLE 1

| | Gap (mm) G1 |
|---|---|
| Clip 21 (comparative example) | 0.470 |
| Clip 22 (comparative example) | 0.731 |
| Clip 10 (example) | 0.470 |

From the results of Table 1, it will be seen that, in the clips 21 and 10, their gaps G1 are substantially equivalent to each other, and, in the clip 22, the gap G1 is remarkably larger than the gaps of the other clips.

On the other hand, in the clip 21, A very large force is necessary to push the clip as compared with the clips 22 and 10, and therefore the workability of the insertion was not good.

By contrast, it was found that the clip 10 according to the embodiment of the invention can be inserted by a relative small inserting force, and rattling in a state where the clip is engaged and fixed to the rectangular hole 31 is reduced.

The entire disclosure of Japanese Patent Application No. 2005-273745 filed on Sep. 21, 2005 including specification, claims, drawings and abstract is incorporated herein be reference in its entirety.

What is claimed is:

1. A clip to be inserted into, and fixed to, a rectangular hole formed in an attached member, the clip comprising:
    a base body portion that engages the rectangular hole on one side of the attached member;
    a stem portion that extends from the base body portion to be insertable into the rectangular hole; and
    a pair of engaging legs that extend from an end portion of the stem portion toward the base body portion in an anchor leg-like manner,
    wherein engaging portions are disposed in ends of the engaging legs, respectively, to engage with the rectangular hole on an other side of the attached member,
    wherein widths of the engaging legs are formed to be gradually enlarged from the end portion of the stem portion toward the base body portion,
    wherein each of the engaging legs comprises:
        a straight portion that extends at a substantially constant width from the base portions of said each of the engaging legs toward end portions of said each of the engaging legs; and
        a widened portion, having a different thickness from, and attached to, said straight portion, and
    wherein said widened portion extends from at least one side of the straight portion of said each of the engaging legs to be gradually enlarged toward the end portions of said each of the engaging legs, and
    wherein outer side faces of the widened portion are formed to bend toward the stem portion rather than outer side faces of the straight portion.

2. The clip according to claim 1, wherein widths of end portions of the engaging legs are 1.2 times wider than widths of base portions of the engaging legs.

3. The clip according to claim 1, wherein at least one side of the end portions of the engaging legs is in a substantially identical position in a width direction as a base portion of the stem portion.

4. The clip according to claim 1, wherein the engaging legs are formed to extend at a constant width in a predetermined length range from each of the base portions of the engaging legs, and to be gradually enlarged as advancing from middle portions of the engaging leg toward the end portions of the engaging legs.

5. The clip according to claim 1, further comprising a rib disposed on the base body portion perpendicular to the stem portion, in a location which the stem portion extends from the base body, opposite to said side of the straight portion.

6. The clip according to claim 5, wherein width-direction end portions of the widened portion of the engaging legs butt against one side of an inner periphery of the rectangular hole, and the rib butts against an other side portion in an opposite side of the inner periphery of the rectangular hole.

7. The clip according to claim 1, wherein each of said engaging portions comprises:
    a thin piece which elastically engages with an inner periphery of the rectangular hole; and
    an engaging step which engages with a rear-face peripheral edge of the rectangular hole.

8. The clip according to claim 1, wherein a thickness of the widened portion is thinner than a thickness of the straight portion.

9. The clip according to claim 1, wherein the widened portion has a triangular shape which starts from a middle of the straight portion and extends in a lateral direction.

10. A clip, comprising:
    a base body portion;
    a stem portion that extends from the base body portion to a direction substantially perpendicular to the base body portion, the stem portion including a stem end portion; and
    a pair of engaging legs, each of the engaging legs comprising:
        a base portion that is continuous to the stem portion;
        an end portion that extends from the base portion toward the base body portion, the end portion being wider than the base portion;
        a straight portion that extends at a substantially constant width from the base portion to the end portion; and
        a widened portion, having a different thickness from, and attached to, said straight portion,
    wherein said widened portion extends from at least one side of the straight portion to be gradually enlarged as advancing from the base portion to the end portion, and
    wherein outer side faces of the widened portion are formed to bend toward the stem portion rather than outer side faces of the straight portion.

11. The clip according to claim 10, wherein each engaging leg is formed to be gradually enlarged as advancing from the base portion to the end portion of the engaging leg.

12. The clip according to claim 11, wherein a width of the end portion of each engaging portion is 1.2 times wider than a width of the base portion.

13. The clip according to claim 11, wherein the engaging legs are formed to extend at a constant width in a predetermined length range from the base portions of the engaging legs, and to be gradually enlarged as advancing from a middle portion of the engaging leg toward the end portions of the engaging leg, respectively.

14. The clip according to claim 10, wherein a thickness of the widened portion is thinner than a thickness of the straight portion.

15. The clip according to claim 10, further comprising a rib that is formed on the base body portion perpendicular to the stem portion in a location which the stem portion extends from the base body, opposite to said side of the straight portion.

16. The clip according to claim 15, wherein the base body portion engages with a rectangular hole formed in an attached member on one side of the attached member,
    wherein engaging portions are disposed in ends of the engaging legs to engage with the rectangular hole on an other side of the attached member,
    wherein width-direction end portions of the widened portion of the engaging legs butt against one side of an inner periphery of the rectangular hole, and the rib butts against an other side portion in an opposite side of the inner periphery of the rectangular hole.

17. The clip according to claim 10, wherein the widened portion has a triangular shape which starts from a middle of the straight portion and extends in one lateral direction.

* * * * *